United States Patent Office 3,265,684
Patented August 9, 1966

3,265,684
PROCESS FOR PREPARING 1:1 KETENE-
ISOCYANATE ADDUCTS
John E. Herweh, East Hempfield Township, Lancaster County, and Algirdas C. Poshkus, Lancaster, Pa., assignors to Armstrong Cork Company, Lancaster, Pa., a corporation of Pennsylvania
No Drawing. Filed Dec. 12, 1963, Ser. No. 329,985
3 Claims. (Cl. 260—239)

This invention is for an improved process for preparing 1:1 ketene-isocyanate adducts selected from compounds of the formula

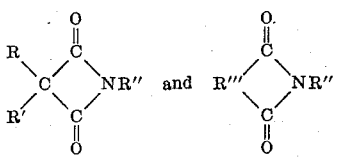

Staudinger reports (H. Staudinger et al., Ber., 47, 40–8; C.A. 8:1112) that diphenyl ketene reacts with phenyl isocyanate to give a 1:1 adduct under vigorous conditions. We have discovered that 1:1 ketene-isocyanate adducts can be made easily and conveniently by reacting an acid chloride of the formula RR′CHCOCl with an isocyanate of the formula R″NCO in the presence of a tertiary amine. The reaction is carried out by refluxing the carbonyl chloride and the isocyanate in an inert organic solution with the tertiary amine. In the formula for the acid chloride, R and R′ are each selected from the group consisting of alkyl radicals of from 1 to 12 carbon atoms and aryl radicals of the following formula

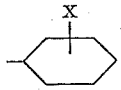

where X may be —H, halogen, —NO$_2$, —OR, alkyl of from 1 to 12 carbon atoms, aryl, or a substitute aryl. In addition, the acid chloride may be a saturated cycloalkyl-carbonyl chloride in which the cycloalkyl R′′′ is of from 3 to 6 carbon atoms.

In accordance with the method of this invention we prefer to react the acid chloride with an aryl isocyanate of the formula

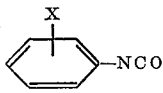

where X may be hydrogen, halogen, NO$_2$, OR, alkyl, or aryl.

Tertiary amines such as pyridine, quinoline, and trialkyl amines, such as triethylamine, may be used in the reaction mixture with trialkyl amines being preferred.

The process of our invention greatly facilitates the production of 1:1 ketene-isocyanate adducts which are useful as acid scavengers for stabilizing polyvinyl chloride and other chlorinated polymers, useful reactants for modifying polymers bearing hydroxyl, carboxyl and amino groups and useful intermediates for making malonamides, malonamic esters, and poly-malonamide.

The process of this invention is illustrated in the following example which sets forth an illustrative embodiment of the invention.

Example

A solution of cyclohexanecarbonyl chloride (36.6 grams) and phenyl isocyanate (29.8 grams) in 250 milliliters of benzene was added dropwise to 32.5 grams of triethylamine at room temperature. The solution was brought to a refluxing temperature and refluxed for 40 hours at which time the solution was cooled and filtered to remove the triethylamine hydrochloride. The filtrate and washings were treated with .5 mole of aniline to remove unreacted phenyl isocyanate as diphenyl urea. The filtrate and washings were washed consecutively with aqueous sodium hydroxide and hydrochloric acid to remove acidic and basic constituents, the latter mainly aniline. The neutral organic solution was evaporated to about ¼ of the original volume. Diphenyl urea and pentamethyleneketene dimer were the major solid products. A small amount of cyclohexaneacetanilide was also isolated, most likely resulting from reaction of aniline with pentamethyleneketene or unreacted cyclohexanecarbonyl chloride.

The filtrate was distilled and 31 grams of the oily solid residue was dissolved in 50 milliliters of hot hexane. Thirteen grams of a solid having an M.P. of 49 to 54° C. was separated from the cooled hexane. Recrystallization from methanol gave 10 grams of the desired product

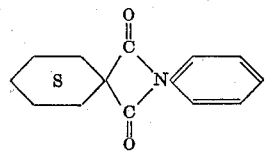

M.P. 57.5 to 59°.
Analysis.—Calcd. for C$_{14}$H$_{15}$NO$_2$: C, 73.19; H, 6.55; N, 6.11; mol. wt. 229. Found: C, 73.39; H, 6.66; N, 6.05; mol. wt. (determined cryoscopically in benzene) 215.

Distillation of the benzene solubles left 17.6 grams of an oily solid that was chromatographed over silica gel and gave an additional 11.7 grams of the adduct.

We claim:
1. A process for preparing compounds selected from the class consisting of

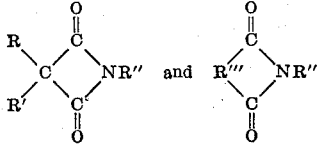

where R and R′ are selected from the group consisting of alkyl radicals of 1 to 12 carbon atoms and

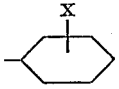

where X is selected from the group consisting of hydrogen, halogen, —NO$_2$, alkyl, alkoxy, and aryl; where R″ is

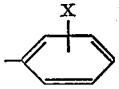

where X is selected from the group consisting of hydrogen, halogen, —NO$_2$, alkoxy, alkyl and aryl and where R′′′ is a cycloalkyl radical of from 3 to 6 carbon atoms; comprising reacting an acid chloride selected from the class consisting of an acid chloride of the formula RR'CHCOCl and an acid chloride of the formula R'''COCl with an isocyanate of the formula R''NCO in the presence of a tertiary amine.

2. A process for preparing

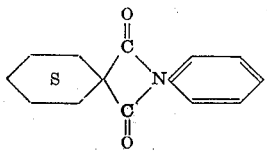

which comprises reacting cyclohexanecarbonyl chloride with phenyl isocyanate in the presence of a tertiary amine.

3. The process of claim 2 in which the cyclohexanecarbonyl chloride is reacted with phenyl isocyanate in refluxing triethylamine.

No references cited.

HENRY R. JILES, *Acting Primary Examiner.*

ALTON D. ROLLINS, *Assistant Examiner.*